May 17, 1960  L. BRADT ET AL  2,936,718
TOW TRUCK SYSTEMS
Filed May 29, 1957  3 Sheets-Sheet 1

INVENTOR
Lynn Bradt
Roy H. Stewart
BY
Frank H. Borden
ATTORNEY May 17, 1960 L. BRADT ET AL 2,936,718
TOW TRUCK SYSTEMS Filed May 29, 1957 3 Sheets-Sheet 3

INVENTOR
Lynn Bradt
Roy H. Stewart
BY
Frank H. Borden
ATTORNEY

United States Patent Office 2,936,718
Patented May 17, 1960

2,936,718
TOW TRUCK SYSTEMS

Lynn Bradt, Easton, Pa., and Roy H. Stewart, Rutland, Vt., assignors to S I Handling Systems, Inc., Easton, Pa., a corporation of Pennsylvania Application May 29, 1957, Serial No. 662,379

20 Claims. (Cl. 104—172)

This invention relates to freight terminal and like tow truck systems, and to improvements in industrial tow trucks for such systems.

In order to expedite the handling, sorting and integrated delivery of freight or cargo in freight terminals or the like, it is standard modern practice to provide closed-circuit path continuously driven flexible conveyors, with various station areas externally of said path. Tow trucks are provided, each of which at its leading end mounts a manually vertically adjustable tow pin or like conveyor, engaging and disengaging a tow link. Tow trucks in the loading areas or stations are loaded by operators, then the respective loaded trucks are pushed manually toward and into general alignment with the conveyor path, and the tow pins of the respective trucks are manually moved so as to automatically engage the conveyor. This starts a loaded truck movement on the closed circuit. When a specific loaded truck, in towed movement with the conveyor, reaches a specific unloading station or area, the tow pin is manually withdrawn and disengaged from the conveyor, the loaded truck is then pushed manually from said path into the desired unloading area. It will be apparent that this requires readily readable indications on each specific truck destined for a specific unloading area, and an operator at each unloading station to read the indication and to retract the tow pin from the instant loaded truck and to push same into the unloading area. When it is realized that there may be in certain cases, one hundred or more unloading stations disposed about the conveyor path, the difficulties of selecting trucks for removal at predetermined unloading stations, and, of greater importance, the high expense entailed, for labor alone, will be appreciated.

The endless conveyor systems as provided hitherto have either been overhead, supported by guides disposed on the ceilings or other supports in spaced relation to the floor of the terminal or warehouse, for towing trucks on such floor through disconnectible coupling members analogous to tow pins, or, and in many ways much more satisfactorily, the conveyor is disposed in the floor below the surface thereof, and an endless guide slot is formed in the floor surface through which truck tow pins, or the like, extend to engagement with the conveyor for towing or disengagement from both the conveyor and the slot when the tow pin is disengaged, for moving the instant truck manually from the conveyor path onto the selected station area.

It is a primary object of this invention to provide means for automatically removing the tow pin of a given selected truck of a successive plurality of trucks from the conveyor, at a single predetermined station only. It is a further object of the invention to shunt such selected individual truck or series of related trucks toward the predetermined station, automatically. Additional objects of the invention are; to provide improvements in the tow pin organizations of trucks; to provide means on trucks responsive to signal devices located adjacent to the path of travel of all trucks, for predeterminedly and automatically selecting trucks for one given destination for diverting same from said path; to provide shunt paths at each station for selected reception of trucks diverted from the main path of travel; to provide modified bumper organizations on trucks by which any following or succeeding truck can bump a preceding truck toward one side thereof when the tow pin of the latter has been disconnected from the conveyor, to facilitate moving such truck along the shunt path at the given station; to utilize the tow pin after dislodgment from the conveyor in the conveyor slot for guiding a given truck along a shunt slot defined path at a given station; to improve the guide slot configuration in tow truck systems; to provide switching from a main closed circuit slot onto selected shunt slots in tow truck systems; to provide automatic switching between one conveyor and another in a multiplane conveyor system; to provide automatic switching of trucks from a main slot to a shunt slot; to provide a shunt slot as separate from and out of communication with the main slot, with a complemental truck providing automatic guiding of tow pin means in said shunt slot as part of the tow pin means is automatically withdrawn from the main slot; to provide tow pin means on trucks responsive to withdrawal from the towed disposition with the conveyor for biasing the tow pin laterally toward entry into a communicating shunt slot; to provide automatic switching of a given truck from one conveyor system to another conveyor system; and many other objects and advantages will become more apparent as the description proceeds.

In the accompanying drawings forming part of this description.

Figures 1, 2, 3, 17, 18, 19:
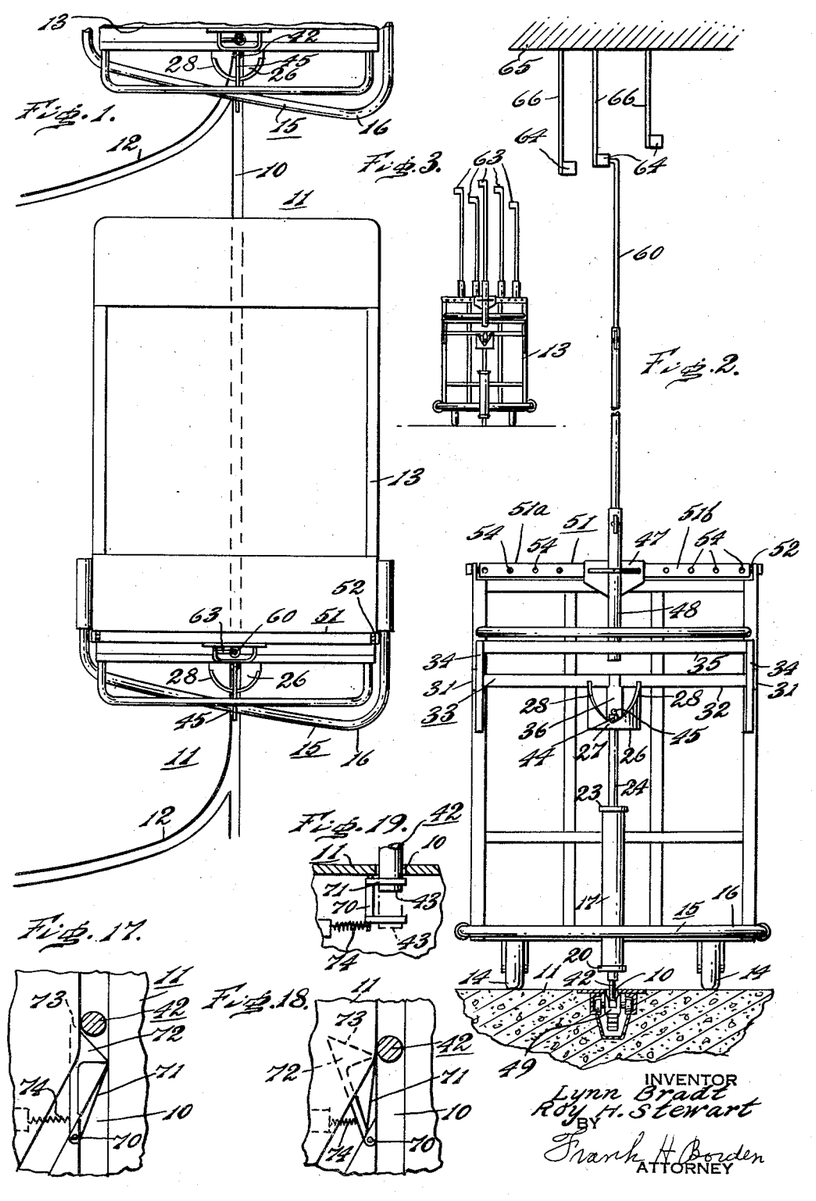
Fig. 1 represents a fragmentary plan of a portion of a floor of a terminal having a main slot and an illustrative two shunt or sub-slots leading into unloading stations, with a purely illustrative truck shown in plan generally aligned with the main slot, having passed one shunt slot and approaching the other shunt slot in theoretical motion with the conveyor downwardly of the sheet, and illustrating some of the features of the leading or front end of the truck with which the invention is concerned.
Fig. 2 represents a fragmentary vertical section through the floor of the terminal and of the ceiling or the like thereof, showing an illustrative series of fixed station signals as viewed in looking toward the rear, with a truck illustrating part at least of the invention shown in front elevation, with its adjustable tow pin engaged with the conveyor shown beneath the main slot.
Fig. 3 represents schematically a front elevation of a purely illustrative series of trucks, illustrating the signal masts in various attitudes in position to be engaged and actuated respectively by a selected one of the ceiling supported signals shown illustratively in Fig. 2.
Figs. 17, 18 and 19 represent fragmentary schematic details of an automatic switching organization as useable with the tow pin of the invention for automatic switching onto a shunt line when the instant tow pin is raised, and for guided motion along the main slot in the floor when the tow pin is in its lowered attitude engaging the conveyor, avoiding the shunt switch.
Figures 9, 10, 11, 12, 13, 14, 15, 16:
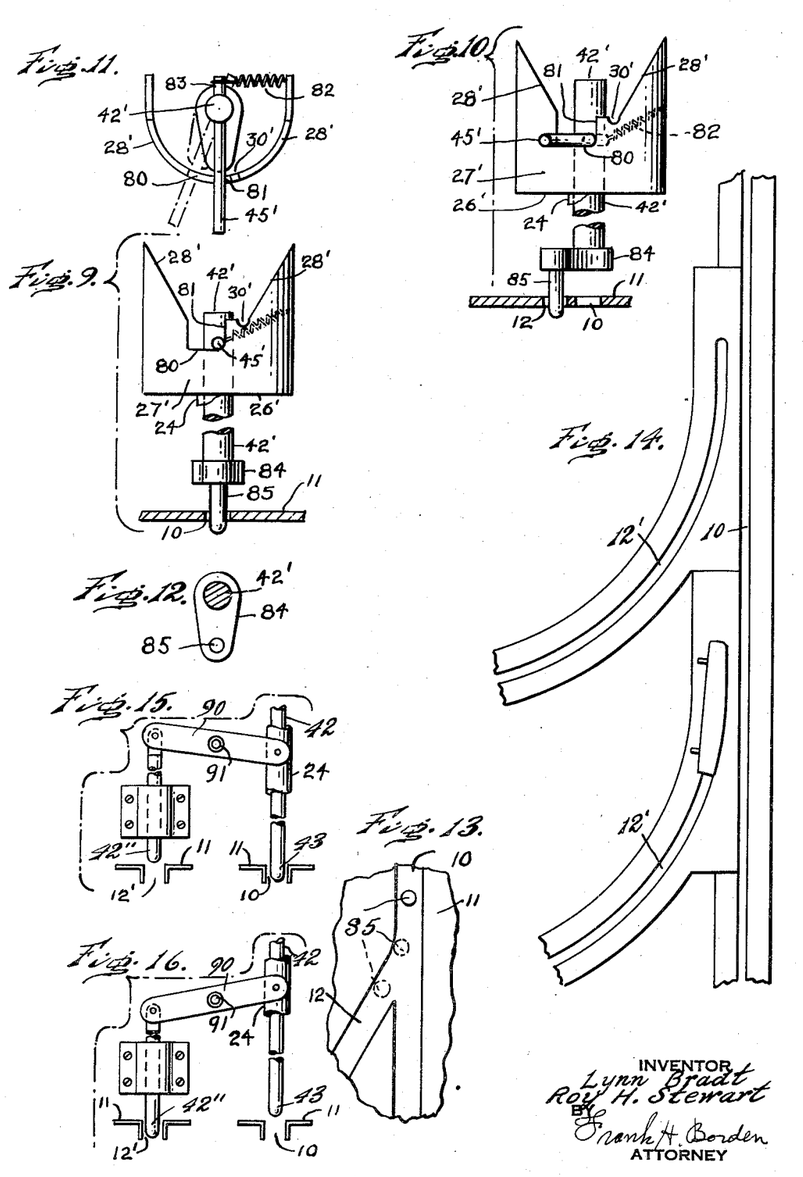
Fig. 9 represents a schematic fragmentary front elevation of a modified, torsionally biased form of the tow pin organization, with the tow pin held in the main slot 10, and in engagement with the conveyor system, (not shown).
Fig. 10 represents a similar view with the tow pin organization elevated and turned under the force of the spring bias, as the tow pin moves into an instant shunt slot, showing the relative disposition of the parts.
Fig. 11 represents a schematic plan of the tow pin organization in the position of the parts indicated in Fig. 9.
Fig. 12 represents a horizontal section looking down toward the lower end of the tow pin organization.
Fig. 13 represents a fragmentary schematic plan of the slot organization in the floor of the terminal showing in full lines the approach of the tow pin of the organization of Fig. 9 along the main slot, and in dotted lines its forced entry into and guidance along an illustrative shunt slot, as a function of the bias on the tow pin.
Fig. 14 represents schematically and fragmentarily a portion of a terminal floor with a continuous and uninterrupted main slot, with a plurality of shunt slots in said floor, out of communication with said main slot.
Fig. 15 represents a fragmentary elevation of a modified tow pin organization in which the main tow pin is mounted in a main slot, with a reciprocal tow pin elevated out of engagement with either a shunt slot, as in Fig. 14 or with a transverse conveyor system to which the truck is to be engaged (not shown).
Fig. 16 represents the same organization as Fig. 15 but with the main tow pin elevated out of engagement with a first conveyor system and out of its associated slot, while the reciprocal tow pin is lowered into a detached shunt slot, or into engagement with a separate conveyor system (not shown).

In the simplest form of the invention, as shown in plan in Fig. 1, the floor, in the case of the floor conveyor, or the ceiling in case of the overhead conveyor, is provided with a closed circuit continuous conveyor (not shown in this figure), in juxtaposed alignment with an endless circuit main slot 10. For illustration it will be assumed that the slot is in the floor 11, and that there are a plurality of station shunt slots 12 for guiding trucks from the main slot to the respective given stations for unloading or the like. The main slot adjacent to the shunt slot in the line of truck movement toward the shunt slot is preferably substantially linear, as shown in Figs. 1 and 14. The juncture of any given arcuate sub-slot or shunt with the main slot may be an open switch connection, as shown in Fig. 1, or it may have a movable wedge or switch point to assist the guiding of a tow pin of a selected truck from the main slot 10 into the sub-slot 12, as shown in Figs. 17, 18 and 19.

The truck 13 is of conventional construction to receive cargo and has usually four castering wheels 14. At the leading end however the truck is modified by having an asymmetrical cushioned bumper element 15, having its most forward projection or longitudinal protuberance 16 toward one lateral edge of the truck, disposed on the opposite side of the longitudinal axis of the truck from the direction of the divergence of the sub or shunt slots 12 from the main slot 10. This is for the purpose of guidingly impinging an immediately succeeding truck on the linear portion of the main slot, against the immediately preceding truck in the line of trucks on the conveyor, after the tow pin of the latter has been disengaged from the conveyor, without removal (in the preferred embodiment), from either the main or shunt or sub-slot in accordance with the invention. The impact and thrust of the projecting portion or forward longitudinal protuberance 16 of the bumper being toward an extreme edge of the rear end of such preceding truck, laterally of its longitudinal axis, produces a lateral moment urging the front end of the truck (and the tow pin to be described) toward the entrance into shunt or sub-slot 12, out of main slot 10, to force the instant truck part way at least into and along said sub-slot.

At the leading edge of the truck, behind the bumper 15, usually, is the tow pin means or organization. For illustrative purposes this may be considered generically as a tow pin, gravitationally biased toward lodgement in a link of the conveyor, and movable against the bias in response to a signal actuation into retraction from such link, usually and preferably, but not necessarily without dislodgement from the main slot 10 or sub or shunt slot 12. The illustrative organization will first be described.

A stationary vertical cylinder 17 is fixed to the front of the truck 13, toward the lower edge and in the center thereof, in suitably spaced relation to the floor 11 of the terminal or like building, and the lower end thereof is closed by a short hollow cylindrical extent of cushioning material such as a hollow sleeve of rubber or the like, 18, retained by an apertured lower end cap 20. The cylinder 17 is anchored and supported by upper and lower supports 21 and 22 mounted on the front end of truck 13. The upper end of cylinder 17 is closed by an apertured cap 23.

A smaller cylinder or tubular member 24, of greater length than cylinder 17, is disposed concentrically and slidably within said cylinder 17, in guided relation to the aperture in the upper cap 23 and the lower cushioning sleeve 18, and mounts a rigid washer 25 below the upper cap 23. At the upper end the smaller cylinder 24 rigidly mounts a latch plate or latching member 26, merging at the front into a wall 27, curving up in both directions rearwardly in camming surfaces 28, respectively, leading into handle-retention notches 30, toward the upper ends of surfaces 28.

On brackets 31, fixed to the front of the truck, a transverse shaft 32 is journalled for oscillation, and rigidly mounts a lever 33 having two oppositely extending arms comprising upper arms 34 mounting a transverse cross bar 35, and usually a single centered lower arm 36. The latter at its lower end mounts a forwardly projecting detent, or dog or latch 37 having an upper forwardly tapered camming surface 38. A biasing compression spring 39 is interposed between the truck and the rear surface of the lower arm 36 to urge the latter and latch 37 forward, while the upper transverse cross bar is urged rearwardly toward the truck. The engageable and releasable latch, dog or detent 37 overlies the latching member or latch plate 26 and prevents it from rising, under the biasing means to be described. The latch plate 26 and latch 37 together comprise latching means.

A compression spring 41 encircles smaller cylinder or slidable tubular member 24 within the larger cylinder 17, and is compressed between the washer 25 at one end and the upper edge of the cushioning tubular member 18 at the other, and comprises a bias or biasing means which biases the tubular member 24 vertically.

Figures 4, 6, 7, 8:
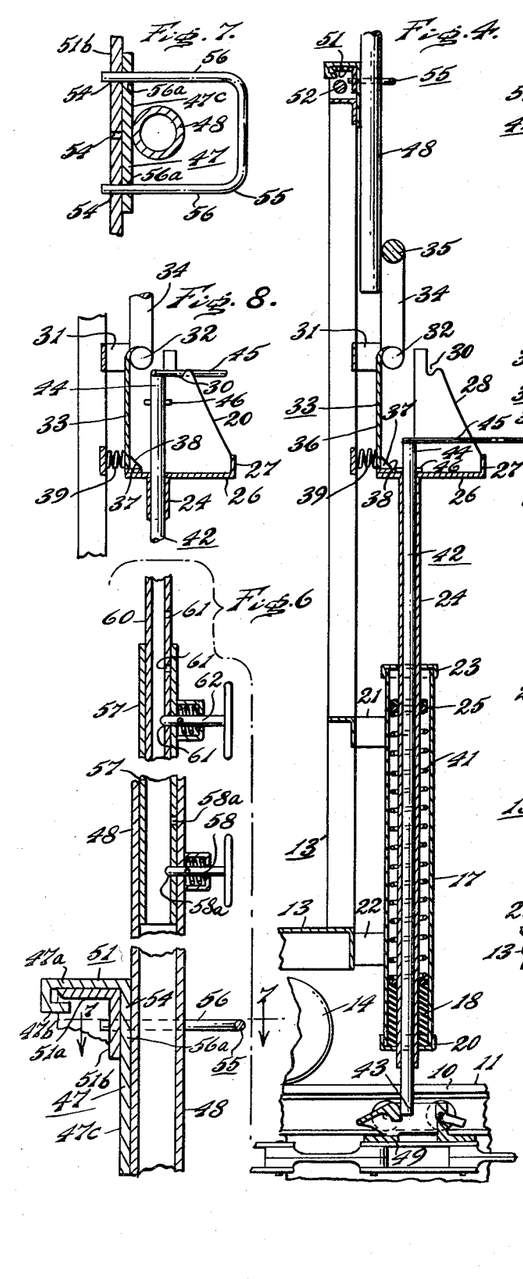
Fig. 4 represents a fragmentary longitudinal vertical section through the front end of a truck according to the invention showing the lower portion of the tow pin organization in the lowered conveyor engaging position shown in Fig. 2.
Fig. 6 represents a fragmentary vertical section through a portion of the tow pin organization, showing a portion of a front end element of a truck to which the remainder of the organization is adjustably and pivotally secured for tilting reaction to a selected signal at a given station.
Fig. 7 represents a fragmentary horizontal section through the truck's front end, as taken on line 7—7 of Fig. 6.
Fig. 8 represents a fragmentary vertical section through part of the organization shown in Figs. 4 and 5, with the tow pin handle engaged in an elevated recess as a result of manual manipulations raising the tow pin out of both the main and the shunt slots, for free movement of the instant truck over the surface of the floor of the terminal.

A gravitationally biased tow pin 42 is provided as a rod, slidable in the smaller cylinder 24, and projecting beyond each end thereof for a certain rather small extent, having a lower conveyor-engaging and disengaging portion 43, and an upper extension 44 mounting a generally radially extending handle 45, projecting forwardly between the camming surfaces 28, of the wall 27 fixed to the plate 26. The upper portion 44 of the tow pin 42 also mounts a transverse stop or abutment or abutment means 46 above the plate 26 in position to be engaged by the plate when the latter is permitted to rise with the tube 24 under the force of spring 41, to forcibly elevate the tow pin or rod 42, as will be described. In the latched down position of the plate 26, restrained by the dog or detent 37, it is preferred that the stop 46 be slightly spaced from plate 26 in order to let the tow pin float gravitationally relative to the rest of the mechanism so that the lower end 43 thereof passing through slot 10 can freely enter a tow link on the conveyor 49 as it moves toward the tow pin in its guided path. As illustrated in Fig. 4, the pin 42 has engaged one of the tow links of conveyor 49 and the truck 13 is being pulled toward the right thereby, and the tow pin is floating gravitationally relative to the plate 26 and cylinder 24, which latter is latched down by the dog or detent 37 overlying plate 26. Preferably the lower end 43 of pin 42 in its engagement with a tow link is laterally horizontally restrained thereby.

It will be understood that the conveyor 49, per se, forms no part of the present invention, and any of several forms may be used as is most convenient. For illustrative purposes only reference may be made, for instance, to a brochure issued by the Link Belt Company, entitled "Trukveyors" designated as "Book 2497."

It will be apparent from Fig. 4, that if the upper transverse cross bar 35, were moved forwardly about the pivot axis of the transverse shaft 32 to a sufficient degree, the lower lever arm 36 would move rearwardly against the force of spring 39 and withdraw the dog or detent 37 from its restraining position overlying the plate 26. Immediately thereupon under the urge of the spring 41 the small cylinder 24 and the integral plate 26 will be elevated. The rising plate 26 will abut the abutment element 46 and forcibly raise the tow pin 42 vertically. This tow pin elevation is preferably just enough to withdraw the tow pin lower end 43 out of the engaged tow link on conveyor 49 without retraction thereof from the slot 10. This is the condition indicated in Fig. 5. Of course the degree of elevation of the tow pin is a matter of proportioning of the parts and dimensions, and if it is desired to withdraw the pin end from the slot 10, this can readily be accomplished.

Figure 5:
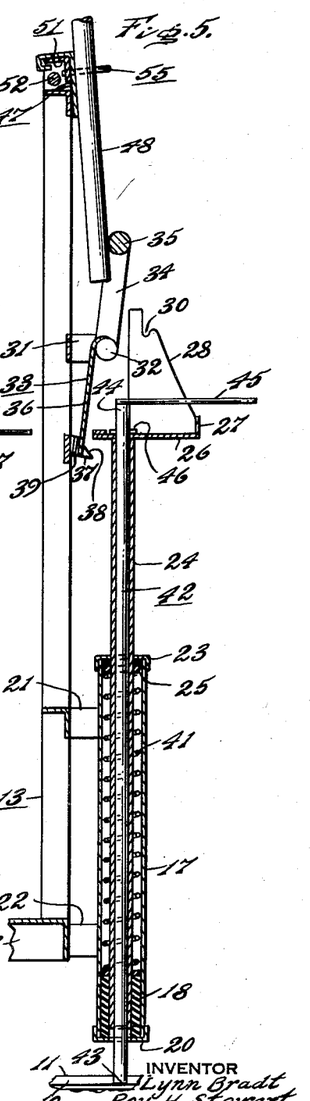
Fig. 5 represents the same organization as in Fig. 4, but in its tripped actuated position, with the tow pin raised from engagement with the conveyor, but with its lower end still engaged in the slot in the floor, preliminary to entry into a shunt slot for continued guidance therein in moving into an unloading area.

At any time after the automatic elevation of the tow pin by means to be described, the mechanism can be reset by pushing down on the pin handle 45, forcing the abutment 46 against the plate 26 and lowering the plate against the increased loading of the spring 41. At the beginning of the reset the detent or dog 37 is below the plate 26, as indicated in Fig. 5, but if the pressure on the cross bar 35 has been released the spring 39 will have pushed the lever arm 36 against the plate 26. The descending plate 26 engages the sloping surface 38 of the detent, momentarily pushing the lever arm 36 to the rear until the plate passes beyond the detent, upon which the spring 39 snaps the detent forwardly over the plate and the plate is re-latched.

It will be apparent that the tow pin can at any time be fully retracted manually, regardless of the latched or unlatched attitude of the plate 26. This is accomplished by turning the handle 45 against one of the camming surfaces 28, and the pin can be held in its fully retracted position for any desired length of time, as during a loading period for instance, by moving and elevating the handle far enough to permit it to lodge in the notch or recess 30 in the given camming surface. Such retraction for instance, can be maintained during loading and until the truck is moved manually from the loading area and into general alignment with the main slot 10. Release of the handle permits the tow pin to enter the main slot 10, and if the plate has meanwhile been latched, the pin engages the next passing tow link and the truck is set into towed motion.

While it will be apparent that any means may be used for retracting the detent or latch, such as a solenoid for instance, suitably energized at the given selected station, it is preferred in this particular instance to utilize coded mechanical signal means to be described.

Within the purview of this invention it becomes necessary to cause the lever 33 of one given truck, or of a series of related trucks, to be swung to unlatch the plate 26 to partially or fully retract the tow pin of the instant truck or series of trucks. This requires complemental coded signals respectively fixed adjacent to each station or unloading area mounted on the truck. In an illustrative organization, to be described, a ceiling-supported impact member is disposed above the path area of the towed trucks, while a complemental impact member is pivotally mounted on a truck to engage and to be deflected under the ceiling impact member, with the tilting of the truck-mounted member actuating the lever 33 to raise the instant tow pin, for shunting same from the main slot 10 into the instant shunt slot 12, or into the instant station area without a shunt slot, if for any purpose this should be preferred.

One of the problems in a multiple station system (sometimes identified in terminals as "doors," by relation of a given unloading area with a door or doors through which the unloaded cargo is passed into shipping conveyances) is the fact that for successful automatic operation the signals adjacent to the respective stations must be respectively such that only a truck bearing a coordinated complemental signal to any given station signal will be automatically actuated for shunting while all other trucks having signals for other stations will pass by the given station signal without activation. For purely illustrative purposes let it be assumed that the system has one hundred stations, some or all of which are active during the same work interval. For facilitation of understanding of the coding system, the features of the invention as it pertains to the trucks will now be described.

In a purely illustrative form of signal device the truck 13 at its forward end at the top thereof journals a horizontal pivot shaft 52 in vertical extensions of the side frame members of the truck. An angle iron 51 is rigidly secured to the shaft 52, and preferably extends transversely substantially the full width of the truck. If desired, for coding additional signals, as will be explained, the angle piece 51 may project beyond the sides of the truck 13. The angle section 51 has a generally horizontal top arm 51a and a generally vertical front face arm 51b. The front face 51b is provided throughout its length with a plurality of horizontally aligned evenly spaced apertures 54 each normal to said face, for a purpose to be explained. A spanwisely or transversely short angle section 47 is provided having a generally horizontal arm 47a having a rear lip 47b, and a front arm portion 47c. The section 47 is slidably mounted on the section 51, with its front arm 47c overlying and bearing against the front face arm 51b. The rear lip 47b engages about the rear edge of the upper arm 51a and retains the slidably guided angle section 47 against motion forwardly of the truck under loads to be described.

The transversely short angle section 47 is provided in its front arm portion 47c with a pair of horizontally aligned apertures 56a, normal to said arm portion and so disposed as to register with pairs of apertures 54 in the contiguous front arm or face 51b. Preferably the apertures 56a are spaced on centers a distance twice as wide as the spacing of the apertures 54. A U-shaped pin 55 is provided having parallel legs 56 on the same centers as the two apertures 56a, and arranged to be inserted into and readily removed from apertures 56a and that pair of apertures 54 with which apertures 56a are in instantaneous registration. With an illustrative eleven apertures 54 in the arm 51a, it will be seen that angle section 47 can be disposed and firmly secured at ten evenly spaced positions transversely of the truck 13, thus establishing transverse adjustments of the mast, to be described.

A vertical tube 48 is rigidly secured as by welding to the front generally vertical arm 47c of transversely adjustable section 47. The tube 48 is of such length as to pass downwardly beyond the cross bar 35 of the lever 33, and between the cross bar and the front of the truck. A tubular member 57, Figure 6, is telescopically mounted in the upper end of tube 48, and is held in a selected vertical extension by means of a manually operable spring-pressed pin 58 mounted on tube 48 and entering a selected aperture of a series of vertically aligned apertures 58a in tubular member 57. A terminal mast member 60 is provided in telescopic mounting in tubular member 57 and has a vertically aligned series of evenly spaced radial apertures 61, preferably and illustratively ten in number, into which in selected positions of vertical adjustment of the mast member and the cylinder, tube or tubular member 48, the manually operable spring-pressed pin 62 mounted on tubular member 57, may enter to establish a total predetermined length of the distance from the pivot 52 to the free end of the mast. The upper free end of the mast portion 60, mounts a small flag impact member 63 (shown in Figs. 1 and 3.) It is generally preferred to provide the intermediate tubular member 57 to take care of variations in distances between ceilings and floors of various terminal buildings, but where these are exactly known, the mast portion 61 may be mounted directly on tube 48, if desired.

In order to actuate the tow pin release at given stations, while not actuating same at other stations, a plurality of station signal impact members 64 are provided, depending from the ceiling or other elevated support 65 and rigid in the direction of truck movement. They may be pivoted to the support in any desired manner so as to be swung laterally and upwardly out of the zone of mast travel with the respective trucks.

It will be understood that if any flag 63 on a compound mast on a truck impinges against a stationary impact member 64, the mast will thereby be swung to the rear by the advancing truck, i.e. the mast portion 60, the tubular member 57, the tube 48, the anchored section 47, and the supporting angle section 51 will swing as a substantially rigid unit about the axis of shaft 52 as a pivot. This motion of the upper end of the mast rearwardly is continued until the lower end of tube 48, in moving the cross bar 35 forwardly, engages cross bar or rod 35, moving it forwardly about its pivot 32, forcing arm 33 to the rear, against the resistance of spring 39, and withdrawing latch 37 from over the latch plate or member 26, which responds to the bias of spring 41 and with tubular member 24 snaps upwardly, and by engagement of abutment 46, raises the tow pin 42 to its desired elevated position. At this point the mast flag 63 will have moved out from its contact with impingement member 64, after which under the force of spring 39, and the rearward pressure from the returning cross bar 35 bearing against the tube 48, the mast will return to its substantially vertical position.

In the illustrative coding of the system it can be considered that in space in a vertical plane above and normal to the floor of the terminal transverse of the main slot 10, the space can be divided into one hundred areas comprising ten transverse or horizontal areas of equal spacing delineated by vertical extensions of the ten laterally spaced settings of the plate 47 and tube 48 on a truck, and by ten vertically spaced settings of the flag 63 on the mast organization of a truck. It will be seen therefore, in the illustrative hundred station system, that the flag 63 of any given truck, by lateral and vertical adjustments, can pass through space in any one of the one hundred areas desired. Relatedly the impact or abutment element 64, by suitable positioning transversely and vertically can occupy a predetermined position in an area complemental to the positioning of a flag 63 on an instant truck, to engage and actuate same. With proper locations of the impact or abutment members 64 along the path of progress of the towed trucks and relatedly proper adjustments of the positions of the flag 63 it will be seen that these relative positionings can be so arranged that but one flag 63 will impinge against a coordinated abutment 64, to actuate only that truck having its flag in the same area as said specific abutment. Of course it will be understood that the flag 63 in its lateral projection from the mast will be in position to engage only the laterally projecting abutment elements 64, and not the standards 66 supporting same.

It will be understood that in all cases the means defining the main slot 10 and the shunt slots 12 and 12' are in fixed relation to the floor 11. Any selected given elevated abutment signal member 64 is in a fixed predetermined relation to the floor, and is separate from and extraneous of any truck, but forms part of the unlatching means. Relatedly the complemental flag impact member or means 63 of a given selected truck, through the train of levers 48 and 33, forms another complemental part of the unlatching means which is mounted on the truck. Of itself lever 33 constitutes unlatching means on the truck.

Let it be assumed that in Fig. 1, the towed truck is to be diverted in the lowermost shunt slot 12, and the flag 63 has been previously forced to the rear and the pin 42 has been withdrawn from the tow link of the conveyor, although still at such level as to be riding in main slot 10. The desire is that the truck will be so activated that the tow pin 42 will leave the main slot 10 and move across the open switch between these components and enter slot 12 toward a station area. As the tow pin is retracted in advance of the entrance of the slot 12, the truck slows down, and may even stop with the tow pin still in slot 10. The next succeeding truck being forcibly towed, as its pin is still in engagement with the instant tow link of the conveyor, advances along the linear portion of the main slot relative to the slowed or stopped preceding truck, and finally abuts same with its bumper 15. However, as the bumper has a high or forward point or forward asymmetrical protuberance or impact area 16, toward one side of the median longitudinal axis of the truck, Figure 1, its impingement is against the said preceding truck on a complemental impact area at the rear and toward one side thereof, so that a lateral moment is engendered about a general center behind the tow pin urging the tow pin 42 on the front end of the truck toward and against the substantially continuous merging edges of the main slot 10 and slot 12, across the open switch, so that the tow pin moves from main slot 10 and into said shunt slot 12. This swings the front end of the truck toward following of its tow pin, and with continued pressure from the succeeding truck the preceding truck is moved out of the truck path of those trucks being towed by the conveyor system. This effects an automatic shunting of preselected trucks toward unloading or like areas, without manual manipulations as a function of rolling motion of the truck.

If the slots 12 are omitted, the automatic withdrawal of the tow pin is with removal of the lower end 43 of the tow pin 42 both from the conveyor and from the slot 10, in which case the succeeding truck bumps the preceding untowed truck onto the unloading area.

It will be seen that as so far described, the entry of the elevated tow pin into the shunt slot 12 from its position riding in main slot 10, but disconnected from the conveyor, is a function of a lateral moment imparted by the next succeeding truck. In some cases, occasionally, with dirt on the floor, or friction in the casters, or the like, the moment may not be developed and the instant truck may continue to move along the main slot without entering the desired shunt slot. Therefore the tow pin organization may be modified to provide positive guiding into the selected shunt slot.

Referring to Figs. 9 to 13 inclusive, which is a skeletonized disclosure, the plate 26' has its front wall 27' provided with an upper substantially planar edge 80 merging at one side in the camming surface 28' or the like and terminated at the other side by the vertical wall 81. The latter connects across a handle-receiving recess 30' with a sloping surface 28' or the like. In the lowered conveyor-engaging position of the pin 42' of the tow-pin organization to be described, the handle or like cross member 45', projecting radially from the pin 42', is juxtaposed to the planar edge 80. A spring 82 engages between a support on the truck and a pin 83, extending radially of the pin 42', exerting a force urging rotation of said pin. At the lower end of pin 42' there is mounted a rigid laterally projecting arm 84, the outer end of which mounts the downwardly extending short secondary pin 85, which is the actual tow pin of the organization. The axis of the tow pin 85 is parallel to but spaced from that of the main pin 42'. In this case it will be understood that the pin element 42' is only a part of the tow pin organization and does not itself engage the towing organization. When the pin element 42' is lowered and latched down, in accordance with the earlier figures, and pin 85 engages the conveyor in slot 10, the truck is towed, but the pin element 42' is subject to a continuous torque from spring 82. This is ineffective so long as the actual tow pin 85 engages the conveyor aligned with the slot 10, but becomes effective when the pin 42' is elevated sufficiently as to be released from the conveyor, while still in slot 10. At this point the bias is effective to cause the actual tow pin 85 moving laterally relative to a substantial center behind the pin, (the axis of pin or shaft 42') to bear against the substantially continuous merging side walls or edges of the slot and shunt slot 12, so that when the pin passes toward and across the shunt slot 12, the torque from spring 82 urges the tow pin 85 to leave the main slot 10 and enter the shunt slot 12. As the entrance to slot 12 is approached and entered, the handle 45' moves across the horizontal edge 80 in response to the torque from spring 82. Of course the bias is so arranged on the tow pin organization that the pin 85 is urged into the mouth of shunt slot 12. It will be seen that as functions of unlatching and of rolling motion of the truck the tow pin 85 is forced into positive guidance into slot 12.

It will be apparent that although the main and shunt slot organizations in the terminal floor can be conveniently installed in new terminals, as integral built-in structures with the conveyor systems, in adapting old terminals to use the invention considerable extra expense is involved by reason of the necessary modifications of the main slot to adapt to the introduced shunt slots. As the slots are usually defined by strips of steel angles, this causes difficulties. Especially for installation in established terminal facilities the form of the invention shown in Figs. 15 and 16 may be used.

It will be seen from Fig. 14 that the main slot 10 may be detached from shunt slots 12', with the entrances of the latter spaced from the main slot. As shown, the shunt slot 12' has a relatively short extent leading from a terminus in general parallelism with the adjacent portion of main slot 10, into a longer extent divergent from the short extent and from the main slot. This facilitates installations of the shunt slots 12' in existing terminal systems already provided with a main slot 10. It will be apparent that within the purview of the invention, the shunt slots, either 12 or 12', may be associated with another conveyor system moving transversely of the main conveyor system associated with slot 10, and at a different level. With the separate shunt slot 12' it is necessary that a main tow pin be provided for slot 10, and an auxiliary tow pin be provided for shunt slot 12', respectively mounted for alternate slot engagements. An illustrative organization for this result is shown in Figs. 15 and 16. According to this disclosure a main tow pin 42 is provided as disclosed in Figs. 8 and 9, having the same operating parts. An auxiliary or complemental tow pin 42" is disposed parallel to tow pin 42 in lateral spacing therefrom similar to that between the substantially parallel portions of main slot 10 and shunt slot 12'. A lever 90 is pivoted at 91 to the truck, and through suitable lost-motion pin and slot connections, to the cylinder 24 at one end and to the complemental tow pin 42" at the other. It will be seen that with the tow pin 42 engaging in slot 10, the lower end of the complemental tow pin 42" is above the level of the floor 11. When the mechanism is tripped to unlatching as the cylinder 24 is raised, carrying pin 42 with it, to a position out of slot 10, the lever 90 swings to depress auxiliary tow pin 42" to entrance into shunt slot 12'.

It will be seen that double tow pins as just described are not only highly effective for use with separate shunt slots 12', they are also quite useable with those terminal floor organizations in which the shunt slot 12 communicates directly with the main slot.

In cases where it is desired to make the system completely automatic, with automatic switching from the main slot and the conveyor into the shunt slot, functional with rolling motion of the truck, an automatic switching organization may be used, as shown in Figs. 17–19 inclusive. In this form of the invention a vertical shaft 70 is suitably journalled beneath the floor 11, and at its upper end mounts a switch point 71, movable between slot, and having a normal position or attitude across the main slot 10, leading into shunt 12 and main slot 10. A camming element 72, having a rearwardly sloping face 73 is mounted on shaft 70 at a lower level than the switch point 71 and extends forwardly beyond the end of point 71, in the line of approach of a towed truck, in position to be engaged and activated by a lowered tow pin, but to fail of being contacted when the tow pin is raised without leaving the slot 10. A spring bias 74 effective on the organization forces the switch point and the camming device to the right to the normal point position as shown in Figs. 17 and 19. In this situation any lowered tow pin moving along slot 10 in its engagement with the tow link engages the camming device 72 before reaching point 71 and forces the cam to the left, synchronously swinging the switch point against the bias from its normal position to close the slot 12 and open slot 10. On the other hand if the tow pin has been raised at the instant station, the raised tow pin finds its end 43 still in slot 10 but above the level of the camming device, so that the tow pin is guided by the switch point 71 in its normal position directly into the slot 12. If its own momentum is not sufficient to carry the rear end of the thus guided truck out of the path of a succeeding truck, impact therefrom will move it out of the way, while still guiding the front end thereof onto the station area.

We claim as our invention:

1. A truck conveyor system comprising a floor over which a truck passes, means in fixed relation to said floor defining a main slot, and means in fixed relation to said floor defining a shunt slot laterally of said main slot, said shunt slot having a portion extending from an effective terminus in parallel spaced relation to the main slot merging into a portion extending in angular divergence from the parallel portion and from said main slot.

2. A truck conveyor system comprising a floor, means defining a main slot in fixed relation to said floor, means defining a shunt slot in fixed relation to the floor, a truck for said floor, tow pin means on said truck comprising a vertically adjustable tow pin disposable in said main slot, means moving said tow pin from a disposition in said main slot to a position clear of said slot, a complemental tow pin clear of said shunt slot in said disposition of the vertically adjustable tow pin, and means vertically moving said complemental tow pin into said shunt slot upon vertical movement of the vertically adjustable tow pin out of said disposition in said main slot.

3. A truck comprising a wheeled vehicle, first and second tow pins mounted movably on said truck, each of said pins having a substantially vertical axis and movable along its axis between first and second positions, the axes of said respective tow pins being in substantially parallel spaced relation and lying in a common plane transverse of said truck, movable correcting means mounted on the truck and connecting said tow pins, means on said truck moving one of said tow pins from its first to its second position and in synchronism therewith moving the other of said tow pins from its second to its first position by movement of said movable connecting means.

4. A truck conveyor system comprising a floor, means defining in fixed relation to said floor a main and a shunt slot having a predetermined spacing in a given plane substantially normal to said main slot, a truck for said floor, first and second vertical parallel tow pins mounted on said truck, said pins having horizontal spacing substantially similar to the said predetermined spacing, and means synchronously vertically moving said first pin out of said main slot and vertically moving said second pin into said shunt slot.

5. A truck conveyor system comprising a floor, a truck for traversing the floor, means in fixed relation to the floor defining plural guiding slots, a conveyor system aligned with one of said slots, movable means on said truck engaging the slot aligned with the conveyor system and engaging said conveyor system and towing said truck relative to said floor, means moving said movable means and disengaging same from said conveyor system and from said aligned slot at a predetermined point on said aligned slot, movable connecting means on said truck connected to said movable means, and supplemental movable means on said truck connected to said movable connecting means and engaging another guiding slot synchronously with such disengagement.

6. A truck conveyor system comprising a floor having a main slot, a conveyor system aligned generally with said slot, a first and a second truck in series relation on said floor, means on the respective trucks coupling same to said conveyor system, means uncoupling said first truck from said conveyor system at a selected position along said slot, and means on said second truck engaging said uncoupled first truck predeterminedly laterally of its median longitudinal axis and developing a lateral moment thereon away from said main slot.

7. A truck conveyor system comprising a floor, a conveyor in said floor, a truck on said floor, tow pin means on said truck comprising a tubular member and a gravitationally biased tow pin slidable vertically on and relative to said tubular member, means on said truck slidably guiding said tubular member in vertical motion, means on said truck biasing said tubular member upwardly, a movable latch on said truck latching said tubular member downwardly against its bias during which said tow pin gravitationally engages said conveyor, abutment means on said tow pin overlying said tubular member and elevating said tow pin out of the conveyor when said latch is released and the tubular member responds to its bias, and means releasing said latch at a predetermined point in the travel of said truck with said conveyor.

8. A truck conveyor system as in claim 7, in which the means releasing the latch comprises a tiltable mast horizontally pivoted on said truck and an elevated device extraneous of said truck and in fixed relation to the floor engageable by said tiltable mast.

9. A truck conveyor system comprising a wheeled vehicle, a vertically extending cylinder mounted on said vehicle, a tubular member slidable in said cylinder, a latching member rigid with the tubular member a tow pin slidable in said tubular member and across said latching member, spring means between said cylinder and said tubular member biasing said latching member upwardly, abutment means on said tow pin engageable by said latching member elevating said tow pin when the latching member moves upwardly in response to the bias, and a releasable latch engaging said latching member and latching said tubular member in a lowered position against the bias of said spring means.

10. A truck conveyor system as in claim 9, and unlatching means releasing said latch whereby the tubular member responds to the bias and moves upwardly and thus elevates said tow pin.

11. A truck conveyor system as in claim 9, in which the releasable latch comprises a horizontally pivoted lever on said truck and having two arms, one arm of which mounts a detent normally overlying said latch member, additional spring bias means on said truck urging said detent toward said latch member, means moving the other arm of said lever against said additional spring bias to release said detent from said latch member.

12. A truck conveyor system as in claim 11 in which said last mentioned means comprises a mast, means on the truck mounting the mast for tilting and for transverse adjustment between selected positions, the said other arm of said lever including a transversely extending cross bar juxtaposed to said mast in each of its adjusted positions and movable in response to tilting of said mast.

13. A truck conveyor system comprising a floor over which a truck passes in rolling movement, means fixed relative to the floor defining an open main slot, a conveyor parallel to said main slot, means fixed relative to the floor defining a shunt slot in intersecting communication with said main slot, in combination with a wheeled truck, tow pin means having a substantially vertical axis and mounted for vertical adjustment on said truck and having first and second positions of adjustment along said axis in both of which positions the tow pin means in alignment with said main slot engages in said main slot. Biasing means between said tow pin means and said truck biasing the tow pin means from its first position to its second position, latching means on said truck latching said tow pin means in its first position against the bias of said biasing means, said tow pin means in its said first position only extending into laterally horizontally retained engagement with said conveyor and towing said truck across the floor, complemental means respectively extraneous of the truck in fixed relation to said floor and on said truck jointly operative at a predetermined point in the towed movement of said truck unlatching said tow pin means, whereby said tow pin means moves under said bias to its said second position, and means guiding said tow pin means in its second position only out of said main slot into said shunt slot functional with rolling movement of said truck.

14. A truck conveyor system as in claim 13, in which said main and shunt slots merge in substantially continuous side edges and said means guiding comprises means operative on the tow pin means in its second position forcing the tow pin means laterally against said substantially continuous merging edges.

15. A truck conveyor system as in claim 14, and means mounting said tow pin means on said truck for transverse lateral motion relative to the truck, said means guiding comprising a spring on the truck connected to said tow pin means forcing the latter against said side edges.

16. A truck conveyor system as in claim 13, in which the means guiding comprises a switch point pivoted to swing between the main slot and the entrance to said shunt slot, means biasing said point to a normal position across the main slot to guide tow pin means in its second position into said shunt slot, a control cam at a lower level than said point and connected thereto and extending beyond said point toward an advancing truck in position to be contacted and moved by its said tow pin means in its said first position moving said point to close the shunt slot.

17. A truck conveyor system as in claim 13, in which the main slot has a substantially linear portion adjacent to said shunt slot merging into said shunt slot by substantially continuous side edges, in which said means guiding comprises towed means coupled to the conveyor impacting against the rear end of the truck predeterminedly laterally of its median longitudinal axis when the truck and towed means are on said linear portion thrusting the truck forwardly while developing a lateral moment forcing the tow pin means against and following said merging side edges to entrance into and along said shunt slot.

18. A truck conveyor system as in claim 17, in which said truck is a first truck and said towed means is a second truck.

19. A truck conveyor system as in claim 18 in which both trucks respectively have impact areas facing toward the other truck, one of said impact areas being longitudinally protuberant beyond its truck, said impact areas having mutual contact only laterally of the main slot in a direction opposite to the shunt slot.

20. A truck conveyor system as in claim 19 in which said one of said impact areas comprises a bumper on its truck forming the protuberant impact area laterally of the center of the other of said trucks.

References Cited in the file of this patent

UNITED STATES PATENTS

| | | |
|---|---|---|
| 1,000,106 | Morris | Aug. 8, 1911 |
| 1,124,269 | Bernheim | Jan. 12, 1915 |
| 1,243,457 | Stuart | Oct. 16, 1917 |
| 2,619,370 | Leger | Nov. 25, 1952 |
| 2,619,916 | Rainier | Dec. 2, 1952 |
| 2,621,609 | McCaul et al. | Dec. 16, 1952 |
| 2,635,555 | Hansson | Apr. 21, 1953 |
| 2,660,127 | Boyko et al. | Nov. 24, 1953 |
| 2,684,039 | King | July 20, 1954 |
| 2,688,936 | Brooks | Sept. 14, 1954 |
| 2,751,851 | Curtis et al. | June 26, 1956 |
| 2,751,852 | Joy | June 26, 1956 |
| 2,782,727 | King | Feb. 26, 1957 |
| 2,816,516 | Diehl | Dec. 17, 1957 |

UNITED STATES PATENT OFFICE

CERTIFICATE OF CORRECTION

Patent No. 2,936,718                        May 17, 1960

Lynn Bradt et al.

It is hereby certified that error appears in the printed specification of the above numbered patent requiring correction and that the said Letters Patent should read as corrected below.

Column 10, line 30, after "slot" and before the comma insert -- 12 and main slot 10 --; column 11, line 9, for "correcting" read -- connecting --; column 12, line 38, for "said main slot. Biasing" read -- said main slot, biasing --.

Signed and sealed this 15th day of November 1960.

(SEAL)
Attest:
KARL H. AXLINE
Attesting Officer

ROBERT C. WATSON
Commissioner of Patents